US006944552B2

(12) United States Patent
Francom et al.

(10) Patent No.: US 6,944,552 B2
(45) Date of Patent: Sep. 13, 2005

(54) SYSTEM AND METHOD FOR DETECTING POWER DEFICIENCIES IN A COMPUTER COMPONENT

(75) Inventors: Erin Francom, Fort Collins, CO (US); Gregory D. Rogers, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 109 days.

(21) Appl. No.: 10/606,134

(22) Filed: Jun. 25, 2003

(65) Prior Publication Data

US 2004/0268277 A1 Dec. 30, 2004

(51) Int. Cl.[7] ............................................. G06F 19/00
(52) U.S. Cl. ............................ 702/57; 702/57; 702/60; 702/65; 702/117; 702/189; 716/5; 716/12; 703/14; 703/15; 703/16; 324/158.1; 324/715; 700/67
(58) Field of Search ........................... 702/57, 60, 65.1, 702/117, 189, 64, 65; 700/67, 68; 324/158.1, 715; 716/5, 12; 703/14, 15, 16; 342/360

(56) References Cited

U.S. PATENT DOCUMENTS

| | | | | |
|---|---|---|---|---|
| 4,989,062 A | * | 1/1991 | Takahashi et al. | 257/207 |
| 6,028,440 A | * | 2/2000 | Roethig et al. | 324/765 |
| 6,741,086 B2 | * | 5/2004 | Maekawa et al. | 324/754 |
| 2001/0054509 A1 | * | 12/2001 | Fujikami et al. | 174/125.1 |
| 2002/0095643 A1 | * | 7/2002 | Shiratori | 716/2 |

OTHER PUBLICATIONS

Hodgdon et al., 'Computation of the Current Density in a Nonlinear Materials Subjected to Large Current Pulses', Sep. 1991, IEEE Article, vol. 27, No. 5, pp. 4101–4104.*
Adler et al., 'A Current Driven Routing and Verification Methodology for Analog Applications', Jan. 2000, IMS Hanover Publicaiton, pp. 385–389.*
Keyes, 'Fundamental Limits of Silicon Technology', Mar. 2001, IEEE Article, vol. 89, No. 3, pp. 227–239.*
Rosenthal et al., 'MHD Modeling of Conductors at Utra-High Current Density', Jan. 2000, IEEE Article, pp. 1–20.*
Sakai et al., 'Critcal Current Densities and Management Hysteresis Losses in Sub–Micron Filament Bronze Processed Nb3Sn Wires', Mar. 1993, IEEE Article, vol. 3, No. 1, pp. 990–993.*

* cited by examiner

Primary Examiner—Marc S. Hoff
Assistant Examiner—Elias Desta

(57) ABSTRACT

One embodiment of the invention is a method for analyzing power in a component comprising determining a plurality of current densities, wherein each current density is associated with one portion of a plurality of portions of the component, determining a plurality of wire densities, wherein each wire density is associated with one region of a plurality of regions of the component, and comparing the plurality of current densities and the plurality of wire densities.

21 Claims, 5 Drawing Sheets

SYSTEM AND METHOD FOR DETECTING POWER DEFICIENCIES IN A COMPUTER COMPONENT

FIELD OF THE INVENTION

This invention relates in general to a computer and in specific to a system and method for determining power deficiencies in a computer component.

DESCRIPTION OF RELATED ART

Typically, one or more pins are used to provided power to a microprocessor chip from an off-chip source. At least one metal layer on the microprocessor chip is used to supply power to different locations on the microprocessor. Typically, more than one layer is used and the layers are arranged in alternating orthogonal layers to form a grid. The power is then consumed by the different components of the processor, e.g. cache, a clock generator, functional units, etc. The different components have different power needs. For example, a clock generator uses more power than a cache on a per area basis. Thus, the distribution of the power supply wires is not uniform, across the chip. Therefore, the layout of the power supply wires is critical to the operation of the microprocessor chip. A deficiency in one area could cause the microprocessor to fail.

Failure typically arises when a component, e.g. a field effect transistor or FET, runs slower because of a power deficiency, which in turn causes the circuit, which may be a collection of FETs, to latch an incorrect value in the next state. Thus, the processor will be operating with incorrect data. The power deficiency may be due to an anemic power grid in that area. In other words, the components on the chip consume as much (or require more) power, e.g. voltage than the power grid can supply to that area of the chip. The power deficiency may be due to an event that occurs that draws a large amount of power, e.g. current, in a very short period of time. For example, such an event may be a simultaneous switching event, where many drivers attempt to drive signals with a large loads at the same time. A power deficiency in this case may also cause a FET to operate more slowly, and thus produce an incorrect value.

Failure may also arise over time. Thus, power grids that were sufficient at first, may degrade over time. A condition known as electro-migration or EM causes the resistance in the power grid to increase, and thus reducing the available power delivering capability. This is due to molecular shifting of atoms causing the formation of voids and defects which effect the conductivity of the metal used in the grid. Therefore, even though the power grids were initially adequate, over time the grids may degrade causing a power deficiency, and thus lead to incorrect values being generated by the components.

In laying out the power grid for a chip, designers have a variety of tools available to assist them in choosing adequate paths for the power wires. Typically, space for power grids is traded off with space for signal lines.

BRIEF SUMMARY OF THE INVENTION

One embodiment of the invention is a method for analyzing power in a component. The method comprises determining a plurality of current densities, wherein each current density is associated with one portion of a plurality of portions of the component, determining a plurality of wire densities, wherein each wire density is associated with one region of a plurality of regions of the component, and comparing the plurality of current densities and the plurality of wire densities.

DETAILED DESCRIPTION

The invention analyzes the power grids and the current requirements for a high level design of a computer component, e.g. a microprocessor chip.

Figure 1:
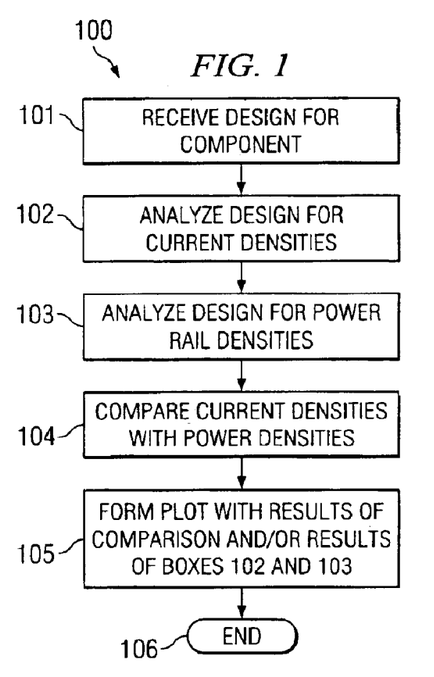
FIG. 1 depicts a flow chart describing an embodiment of the invention.

FIG. 1 depicts a flow chart 100 describing an embodiment of the invention. In box 101, this embodiment preferably receives a design for a component. In its most basic form, the design comprises a layout of a plurality of polygons, e.g. squares and rectangles, on different layers. The polygons are then formed on the silicon chip. The design also preferably includes connectivity information, e.g. which rectangles are connected to supply, which rectangles are connected to ground. The design may also include activity factors for the layout. However, if the activity factors are not included for the layout, then default values may be used. Note that the component may be a processor, a memory chip, a memory controller chip, a chipset component, a communications chip, a graphics chip, other VLSI design components, or any other electrical component.

Figure 2:
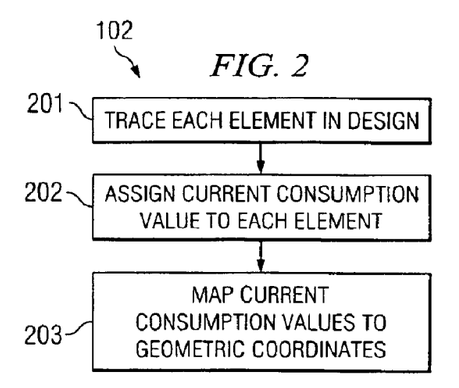
FIG. 2 depicts an example of a flow chart depicting the analysis of box 102 of FIG. 1.

This embodiment then preferably analyzes the design to compute the current densities for the design in box 102. An example of a flow chart depicting the analysis of box 102 is shown in FIG. 2. This embodiment preferably analyzes each element of the design in box 201 to determine its capacitive load, as well as the loads of the devices connected to it for a combined load. Note that each FET has some capacitance on it. When the FET turns on, it's either charging that capacitance (from the supply (VDD)) or discharging it (to ground (GND)). The FET is analyzed or traced to determine its capacitive load, as well as the capacitive load of elements connected to it, i.e. their combined load. Such elements may be one or more of transistors (such as field effect transistors (FETs)) or wire(s), but other elements may be one or more of diodes, capacitors, resistors, inductive elements, or any other electronic elements.

In box 202, the embodiment preferably assigns a current consumption value or current density for each element. Note that only the elements connected to the power rail can be assigned values. Elements that are connected in series have the same current flow through them. The current consumption value ($I_c$) is calculated by:

$$I_c = CVf(A_f)$$

wherein C is the capacitance of the element, V is voltage of the element, f is the frequency (e.g. clock frequency) with which the element is operating, and $A_f$ is the activity factor of the element. The C, V and f are known values that are obtained from the design. The $A_f$ may be a value previously determined by a designer. $I_c$ for a FET element may typically range from 0.01 milliamps (mA) to 5 mA, but may vary above or below this range as values in the equation dictate. Typically as processes advance C decreases, V decreases, f increases, and $A_f$ remains constant. An example for a current FET is C of 1 picofarad (pF), V of 1.5 volts (V), f=1 gigahertz (GHz), and $A_f$ of 0.5, which yields an $I_c$ of 0.75 mA. Note that the activity factor is an indication of how often the element consumes current.

If the Activity Factor, $A_f$, is not known, then it needs to be empirically determined. The derivation would use the element type, as well as types of elements that are upstream and drive this element. Alternatively, $A_f$ may be selected from a table of values based upon recognition of the type of circuit that comprises the element. For example, $A_f$ for a clock FET that switches twice per state will be 1.0. As another example, $A_f$ for a static FET that switches once per state will be 0.5. Note that a static circuit may be a circuit that is comprised of multiple FETs where the output is a static value for a given set of inputs. In other words, if the inputs change, then the output may change, but once the new value is reached, it will remain there until the inputs change. Examples of static circuits include NAND, AND, NOR, OR XNOR, XOR, and inverters. As a further example, $A_f$ for a dynamic circuit (dynamic as compared with a static element) is assumed to be 0.75. The $A_f$ for dynamic logic depends on the value of the input. If the input is typically high, then $A_f$ is 1.0. If the input is typically low, then the $A_f$ is 0.0. If the input is random, then $A_f$ would be 0.5, however a conservative approach would preferably have $A_f$ of 0.75. Note that a dynamic circuit has a lower activity factor than a clock circuit, even though both may switch twice per state. This is because a clock FET will always switch twice per state, while a dynamic FET may switch twice per state, or not switch at all. Thus, when averaged over time, a clock FET is more active than a dynamic FET. Consequently, this embodiment, upon recognizing the type of the element may select an appropriate value for $A_f$.

After determining $I_c$, the embodiment may optionally divide $I_c$ among the legs of the element to provide a more accurate current distribution. When the current through a FET is determined, it is then assigned to that FET. When the FET is a single entity, the current is simply spatially assigned to the centroid of the device in the design. In the design, some FETs may be broken in pieces. Each of these FETS is electrically still one FET, but physically it is in different locations in the design. In order to get the most accurate spatial current assignments, the current is distributed among the different pieces or legs, instead of to the centroid of all the collective pieces.

This embodiment then preferably maps the current consumption values to geometric coordinates of the design in box 203. Thus, the design has associated current consumption values for the different locations of the design. Note that this embodiment may operate at a relatively high level in the hierarchical design, (and FETS and other elements are generally at the lowest level of the design) so the coordinates for the different $I_c$ values are geometrically translated up through the hierarchy to produce coordinates relative to the level of execution or analysis. In other words, since the current is applied to the FET (or other element) the spatial reality of that FET should be localized correctly at the level of analysis. Please consider this analogy to further explain box 203. To find a location of a dot on a piece of paper, on a desk, in a room, in a house, with respect to the house, the location of the dot is translated up from the paper to the desk, and then to the room, and then to the house. Now the location of the dot is known and can be analyzed relative to the house.

Figure 3:
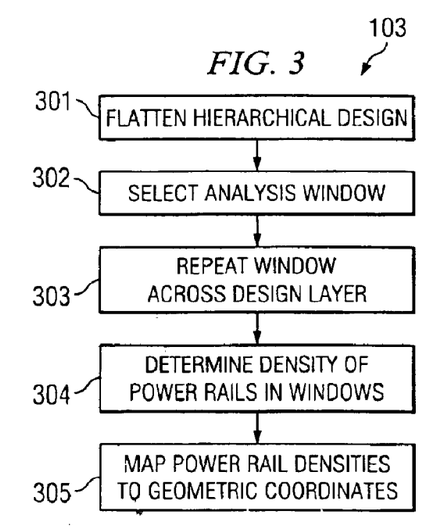
FIG. 3 depicts an example of a flow chart depicting the analysis of box 103 of FIG. 1.

In FIG. 1, this embodiment then preferably analyzes the design to compute the power rail densities for the design in box 103. An example of a flow chart depicting the analysis of box 103 is shown in FIG. 3. If the design is hierarchical, the embodiment preferably flattens the hierarchical design into a single level in box 301. This allows for a flattened current map to be compared to a flattened power rail map. If the design is not hierarchical, this embodiment proceeds with box 302.

In box 302, the embodiment permits the selection of a window size. Selection may be performed by a user or designer, or may be performed by a program. The size of the window determines the granularity of the results of box 303. A larger window results in a smoother curve as more area is factored (or averaged) into the calculation. A smaller window results in a more detailed curve as less area is factored into the calculation, and the curve represents a less averaged result. Thus, a larger window will reduce the effect of a high or low value in the results, while a smaller window will form results that reflect the high or low values. The size of the window may be varied from the smallest area that will form measurable results, e.g. 0.1 microns to 300 microns, although there is no theoretical limit on window size in either direction. The size should be selected based on run time, machine capacity, required level of detail, etc. An example would be a 15 micrometer window for a 0.18 micrometer process. However a window that is 50 to 200 times the process size would work. Note that the window is preferably a square shape, but any polygon shape would function. However, the complexity would increase greatly for windows with more than four sides. Note that the term window means an area of analysis used by the invention.

After selection of the window size, the window is repeated across the layer of the design in box 303. Note that the window may be repeated across the entire layer, or one or more portions of the layer. Widow size may be changed for each layer. For example, in analyzing a high level of hierarchical design, the window size may be increased. This is because the effects of the current densities become aggregated as the level is increased.

This embodiment, in box 304, then determines the density of the power rails or power wires in each of the windows. The embodiment determines an amount of power wire in each window, e.g. an area that the wire occupies of the window. This value is then preferably divided by the area of the window, which then provides the density of the power rails in the window. Note that since it is preferable to have each window be of the same shape and/or size, then the amount of power wire may be used as the density without dividing it by the area of the window. This calculation is performed for each window.

The embodiment then preferably maps the location densities to geometric coordinates of the design in box 305. Thus, the design has associated power grid density values for the different locations of the design.

Each layer may be independently analyzed. Optionally, two or more layers (or all layers) may have their current densities and/or their power rail densities summed into one (or more) representative for analysis. This representation may be used to locate systemic deficiencies. However, an over design on one layer may offset an under design on another layer.

As shown in FIG. 1, the analysis for current density 102 precedes the analysis for power rail density 103. However, this is by way of example only, as boxes 102 and 103 may be performed in either order with respect to each other, or be performed contemporaneous with each other.

In box 104 of FIG. 1, the embodiment optionally compares the current densities derived from box 102 and the power rail densities derived in box 103. Note that this box is optional, as the comparison may be performed by a user. Since this is a comparison, the results do not have units. Comparing current density to power rail density is generally expected to yield data in the range of 0–100,000. For example, Locations with a value of about 2000 or over may be investigated for a possible deficiency. Different designs, types of circuits, types of components, etc. will have different thresholds for failure. The embodiment would then preferably note the coordinates of any locations where the power rail density is below a predetermined value with respect to the current density. This would indicate an area where the design may be power starved.

Although, embodiments of the invention are primarily directed toward locating power rail deficiencies, the embodiments may also note the coordinates of any locations where the power rail density is above a predetermined value with respect to the current density. This would indicate an area in the design where the power rails have been over-designed. This would also indicate an area that has surplus power rails. Thus, the size and/or amount of power rails may be reduced, with the space being used for other components. However, in real world designs, surpluses are of little concern.

The resulting plots may show just the current density, just the power rail density, or plots comparing both of them.

In box 105, the embodiment forms a plot of the results of the comparison(s) of box 104, and/or the current density results of box 102 and/or the power rail density results of box 103. Plotting programs such as gnuplot (see www.gnuplot.info), may be used by the embodiments to plot the results. The plot may then be sent to a printer, a display screen, a network, or another system. After formation of a desired plot, the embodiment ends in box 106.

Figure 4A:
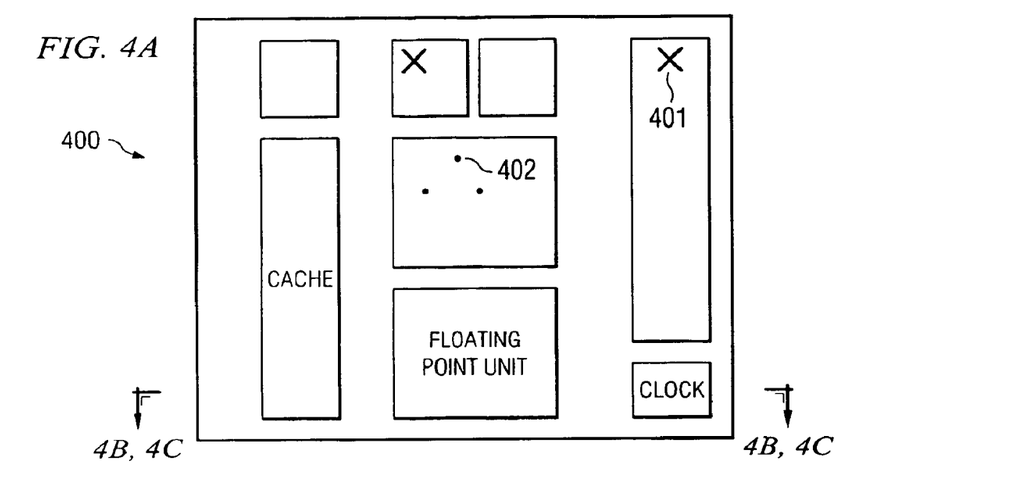
FIGS. 4A–4C depicts examples of plots formed according to the embodiment of FIG. 1.

For example, the embodiment may form a plot similar to the plot 400 shown in FIG. 4A. Plot 400 depicts a typical design for a processor. The embodiment preferably would mark plot 400 with the results of the comparison of box 104. For example, "." 402 may indicate coordinate locations where the power rail density is below a predetermined value with respect to the current density. Similarly, "x" 401 may indicate coordinate locations where the power rail density is above a predetermined value with respect to the current density. Note that the "." and "x" are by way of example only, as other indicators could be used. Other manners of marking the plot may be used, for example, the embodiment may use color, e.g. red areas to indicate coordinate locations where the power rail density is below a predetermined value with respect to the current density, and blue areas to indicate coordinate locations where the power rail density is above a predetermined value with respect to the current density. The colored areas may be darker to indicate a greater departure from the predetermined value and a lighter color to indicate a value closer to the predetermined value. Thus, a dark red area would indicate a coordinate location where the power rail density is well below the predetermined value and a light blue area would indicate a coordinate location where the power rail density is just above the predetermined value.

Note that instead of repeating the window across the design 303, an average density may be optionally used. In some instances, an anomaly may occur in the density calculations that will not adversely affect the design or circuit, but appears as a spike in the comparison plot. The average density may be formed by sliding the window across a portion of the design or by having overlapping windows. This would smooth the data and/or the plot and may avoid some false spikes.

Other manners of marking the plot exist, for example, the data could be imported into a graphical editor and displayed in manners specific to the editor. For example, plot could be color coded for severity and could be overlaid directly on top of the design layout or artwork. In this manner, instead of analyzing an abstract graph or plot, the designer could directly examine the location of the deficiency and attempt to determine the problem. As another example, embodiments of the invention could list deficiencies coordinates in severity sorted order. Thus, the designer would take an X,Y location, zoom into it, and try to determine the problem.

Figure 4B:
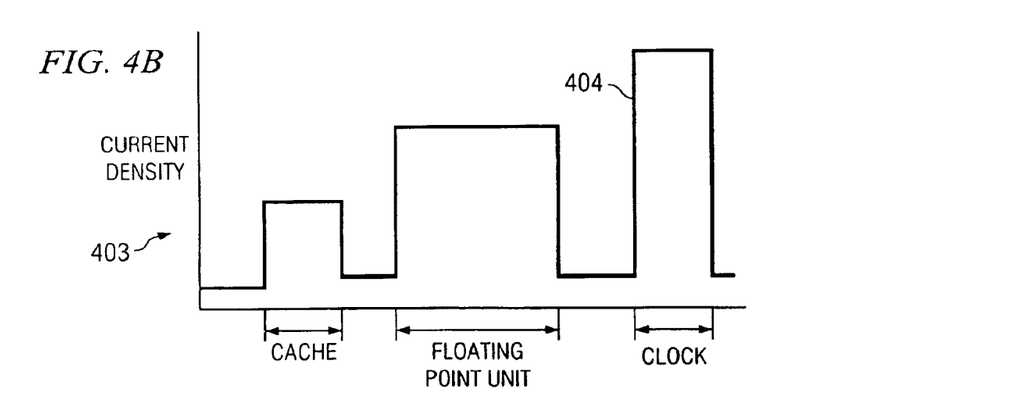
Figure 4C:
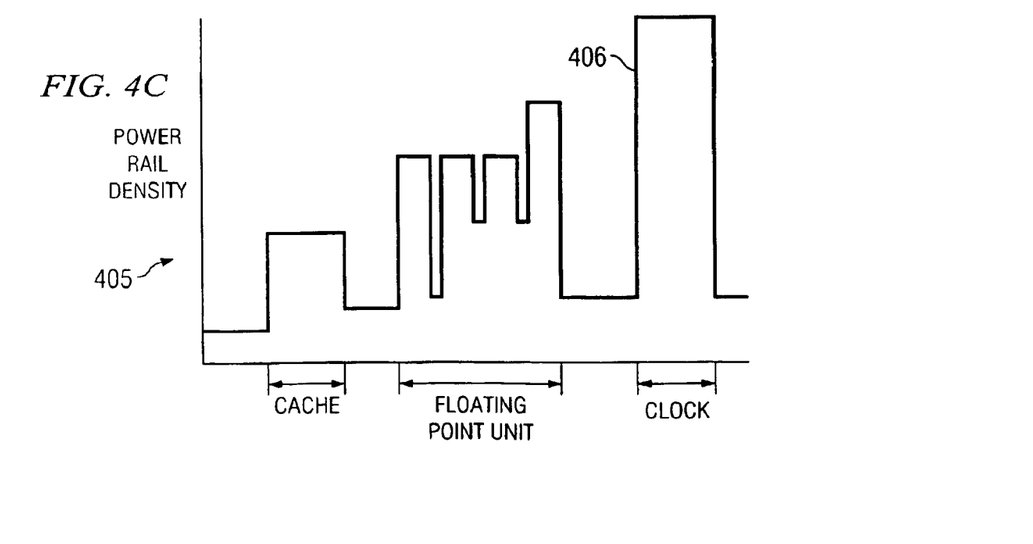
Figure 6:
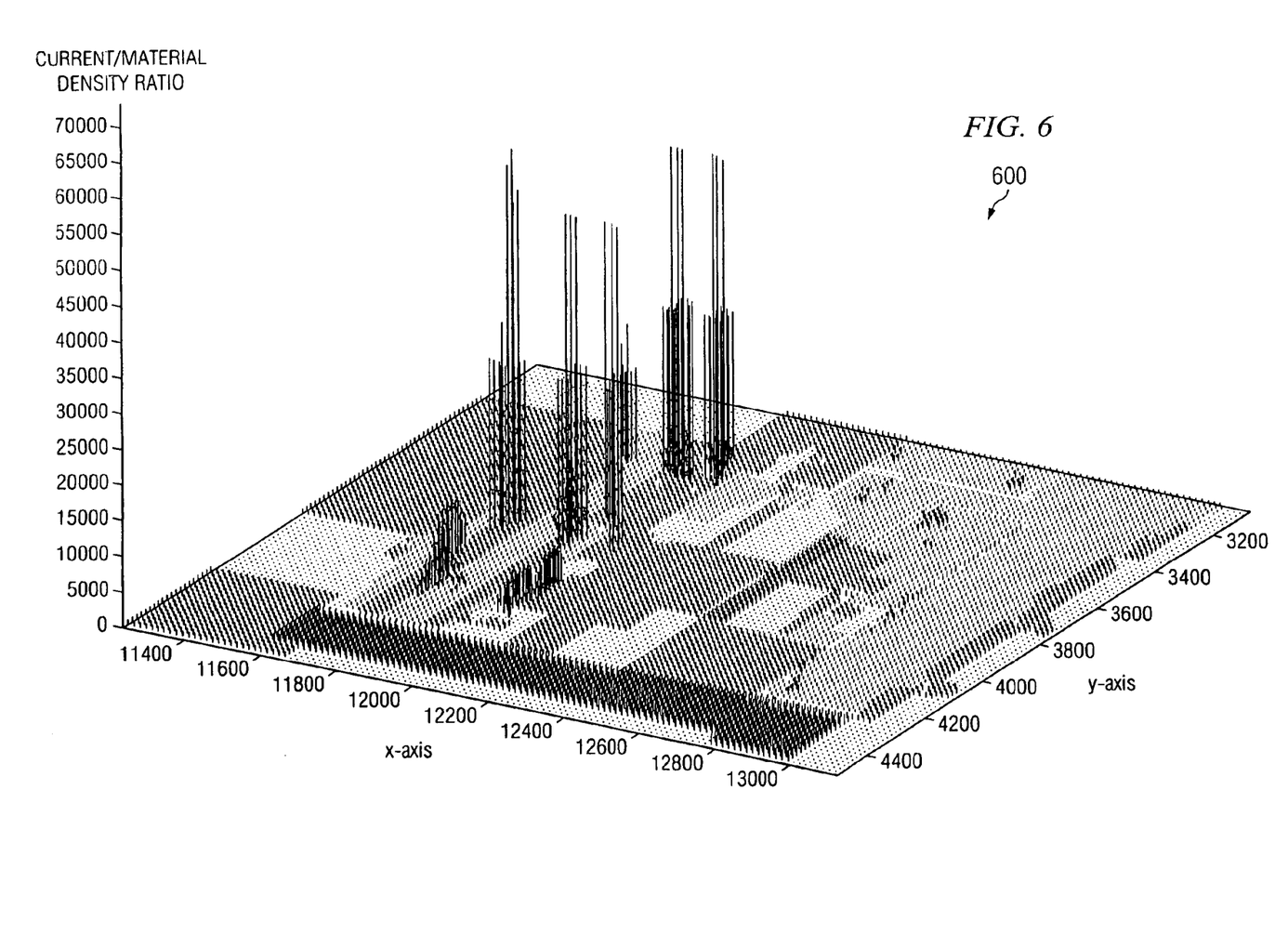
FIG. 6 depicts an example of a plot formed according to embodiments of the invention.
Figure 7:
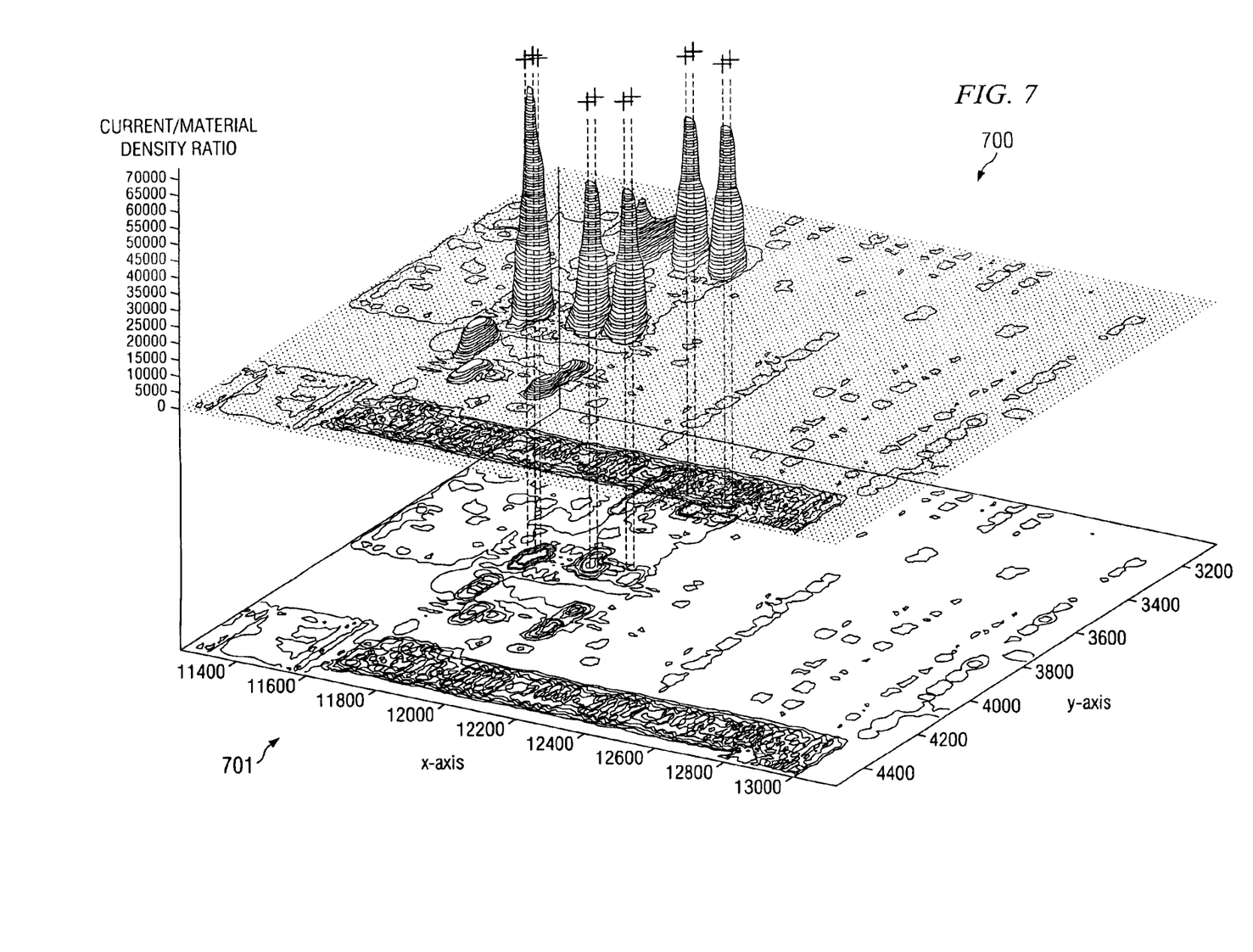
FIG. 7 depicts an example of plots formed according to embodiments of the invention.

The embodiment may form other types of plots, for example, the plot 403 of FIG. 4B depicts an example of the current density 404 along the 'BC' section of the plot of FIG. 4A. Similarly, the plot 405 of FIG. 4C depicts an example of the power rail density 406 along the 'BC' section of the plot of FIG. 4A. Another type of plot is shown in FIG. 6, which depicts a three dimensional plot 600 of the ratio of current density consumed and the wire density (the z-axis) for a two-dimensional layout (the x,y axes). FIG. 6 depicts impulses of ratios for particular locations. Another type of plot is shown in FIG. 7, which depicts a three dimensional plot 700 of the ratio of current density consumed and the wire density (the z-axis) for a two-dimensional layout (the x,y axes). This plot 700 depicts contours for the data. The three dimensional plot 700 is also shown as mapped onto a two dimensional area 701.

Embodiments of the invention are able to move higher in the design because the embodiments of the invention perform the analysis in discreet steps rather than all at once. In other words, the current analysis is done as a separate process, as is the power rail analysis, and the comparison of the results.

When implemented in software, the elements of the present invention are essentially the code segments to perform the necessary tasks. The program or code segments can be stored in a processor readable medium or transmitted by a computer data signal embodied in a carrier wave, or a signal modulated by a carrier over a transmission medium. The "processor readable medium" may include any medium that can store or, transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 5:
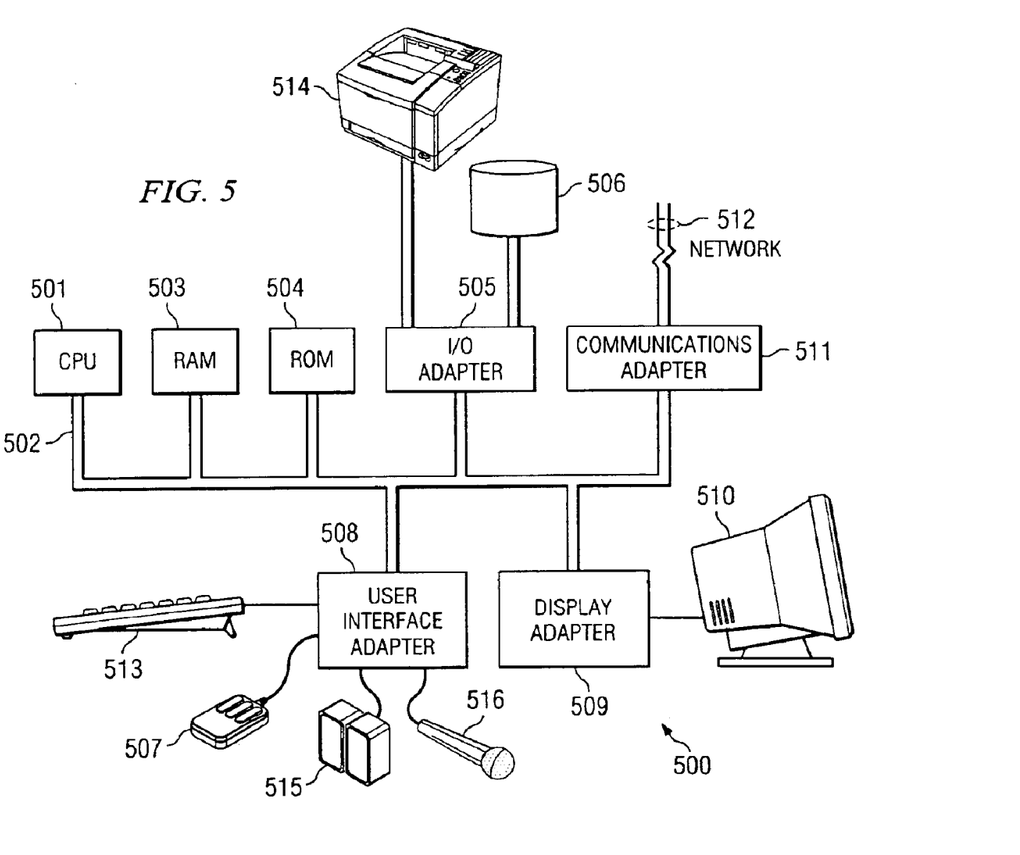
FIG. 5 depicts a block diagram of a computer system which is adapted to use the present invention.

FIG. 5 illustrates computer system 500 adapted to use the present invention. Central processing unit (CPU) 501 is coupled to system bus 502. The CPU 501 may be any general purpose CPU, such as an HP PA-8500 or Intel Pentium processor. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects to storage devices 506, such as one or more of a hard drive, a CD drive, a floppy disk drive, or a tape drive to the computer system. The I/O adapter 505 is also connected to printer 514, which would allow the system to print paper copies of information such as documents, photographs, articles, etc. Note that the printer may a printer (e.g. dot matrix, laser, etc.), a fax machine, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, and microphone 516, to the computer system 500. User interface card 508 also provides sound output to a user via speaker(s) 515. The display card 509 is driven by CPU 501 to control the display on display device 510.

What is claimed is:

1. A method for analyzing power in a component comprising:
    determining a plurality of current densities, wherein each current density is associated with one portion of a plurality of portions of the component;
    determining a plurality of wire densities, wherein each wire density is associated with one region of a plurality of regions of the component; and
    comparing the plurality of current densities and the plurality of wire densities.

2. The method of claim 1, further comprising:
    determining a ratio of the plurality of current densities and the plurality of wire densities; and
    identifying any geometric coordinates whereby the ratio exceeds a predetermined number.

3. The method of claim 1, further comprising:
    selecting the component from the group consisting of:
    a processor, a memory chip, a memory controller chip, a chipset component, a communications chip, a graphics chip, a VLSI component, and a computer component.

4. The method of claim 1, further comprising:
    forming a plot of a ratio of the plurality of current densities and the plurality of wire densities.

5. The method of claim 4, further comprising:
    associating the plot with a portion of a design of the component.

6. The method of claim 1, wherein determining the plurality of current densities comprises:
    determining a respective current consumption value for a plurality of elements within the one portion of the component; and
    mapping the plurality of current consumption values to geometric coordinates for a design of the component.

7. The method of claim 6, wherein the step of determining a respective current consumption value comprises:
    calculating $CVf(A_f)$;
    wherein C is a capacitance of the element, V is a voltage of the element, f is the clock frequency of the element, and $A_f$ is the activity factor of the element.

8. The method of claim 6, wherein the plurality of elements are field effect transistors.

9. The method of claim 6, wherein the elements are connected to a power wire.

10. The method of claim 6, wherein mapping the plurality of current consumption values comprises:
    translating the geometric coordinates to a level of the design that corresponds to a level of analysis for the analyzing power in the component.

11. The method of claim 1, wherein determining a plurality of wire densities comprises:
    repeating a window across a portion of the design of the component;
    determining a density of power wires within each window; and
    mapping the plurality of power wire densities to geometric coordinates for the design of the component.

12. The method of claim 11, wherein determining a plurality of wire densities further comprises:
    selecting a size of the analysis window.

13. The method of claim 12, wherein the design is a hierarchical design that has a plurality of hierarchical levels, the method further comprises:
    increasing the size of the window as a level of interest of the hierarchical design is increased.

14. The method of claim 11, wherein mapping the plurality of current consumption values comprises:
    translating the geometric coordinates to a level of the design that corresponds to a level of analysis for the analyzing power in the component.

15. The method of claim 11, further comprising:
    overlapping the windows to form average values for the wire densities.

16. The method of claim 1, wherein the design has a plurality of power wire levels, and determining a plurality of wire densities further comprises:
    summing the plurality of power wire levels to a single level.

17. The method of claim 1, wherein the design has a plurality of power wire levels, and determining a plurality of wire densities further comprises:
    determining a plurality of wire densities for each level of the design; and
    comparing the plurality of current densities and the plurality of wire densities for each level of the design.

18. The method of claim 1, wherein the design is a hierarchical design that has a plurality of hierarchical levels, the method further comprises:
    flattening the hierarchical design into a single level.

19. The method of claim 1, wherein determining a plurality of wire densities comprises:
    (a) sliding a window across a portion of a region of the design of the component;
    (b) determining a density of power wires within each window;
    repeating (a) and (b) for the region of the design; and
    mapping the plurality of power wire densities to geometric coordinates for the design of the component.

20. A system for current management comprising:
    means for determining a plurality of current densities of a component;
    means for determining a plurality of wire densities of the component; and
    means for forming a comparison of the plurality of current densities and the plurality of wire densities.

21. A computer program product for current management having a computer readable medium, the product comprising:

code, that is stored on the computer readable medium, for determining a plurality of current densities of a component;

code, that is stored on the computer readable medium, for determining a plurality of wire densities of the component; and code, that is stored on the computer readable medium, for forming a representation of the plurality of current densities and the plurality of wire densities that is viewable by a user.

* * * * *